Patented Apr. 21, 1931

1,801,667

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

ARTICLES OF RUBBER AND METHOD OF MAKING SAME

No Drawing.   Application filed April 22, 1927. Serial No. 185,916.

This invention relates to articles composed of rubber and other materials, such as metals, glass, porcelain, bakelite, etc., and to a method of manufacturing such articles. It has for an object to provide a method capable of producing articles of manufacture in which the union between the body of rubber and other material is of much greater strength than is obtainable with the rubber cements now commonly employed. A further object of my invention is to provide a practical method of adhering rubber to other materials with a bond that will have a strength in certain cases greater or equal to the tearing strength of the rubber itself.

A problem of long standing in the rubber industry is that of securely bonding rubber to metals and other backing materials. Rubber itself does not adhere to metals with any great tenacity either when joined thereto by means of rubber cements or when vulcanized in direct contact with metal. Cements of various kinds have been heretofore proposed for this purpose, some of which produce satisfactory bonds between rubber and certain metals, but the majority of which are of little practical value.

The purpose of the present invention is to avoid the difficulties inherent in cement adhesion of rubber to other materials by employing a novel method distinctly different from any heretofore practiced in the industry. Briefly, I have discovered that when a thin film, which may be composed of a wide variety of materials, is baked upon a backing material to form a coating strongly adherent thereto, it is capable of serving as an intermediate tie-layer to which rubber bodies of any desired thickness may be securely bonded. This bond may be effected either by vulcanizing a rubber composition in direct contact with the baked film, or, in certain instances, a better union can be obtained by treating the baked film with a substance soluble in, or adsorbable with respect to, both the baked film and rubber, the rubber composition then being secured to the baked film by the application of heat and pressure.

The process forming the subject matter of this application then consists essentially of the following steps: (1) baking on the backing material a film strongly adherent to the backing material, and (2) vulcanizing rubber in contact with the baked film. A desirable added step in certain instances, consists in coating the baked film, before vulcanization of the rubber in contact therewith, with a substance adsorbable with respect to the baked film and to rubber.

The baked film capable of employment in the invention of this application may be composed of a wide variety of substances which are capable of forming when heated a relatively dry, tough, film strongly adherent to the backing material. Among the substances which I have found to be suitable are, in general, vegetable exudates, asphalts, oxidizable oils and synthetic resins. The following specific substances have been thoroughly tested and have been found to be satisfactory materials for the baked film of the present invention: rubber, thermo-plastic rubber derivatives, Canada balsam, baking varnishes, rosin, linseed oil, tung oil, menhaden oil, mineral rubber, and asphalt. It is to be understood, however, that the present invention is not limited to the above enumerated substances but that any substance which will upon heating form an adherent baked film upon the backing material, may be employed in the present process.

It is also obvious that two or more substances may be mixed to produce the film-forming materials and that the so-called drying agents, or accelerators of film formation, may be employed with the film-forming material. Among the latter class of materials, I have found that magnesium oxide, manganese linoleate, magnesium phosphate, cupric phenol sulfonate and di-ethyl sulfate and nitro-organic compounds are particularly suitable.

Where the film-forming substance is not readily spreadable on the backing in a thin coherent film, I dissolve it in, or admix it with, a liquid, preferably a liquid volatile at temperatures of baking, which will give to the substance the desired spreading or coating properties.

The baking of the film should be carried out at such temperatures and for such times, as to produce a relatively dry film when cooled. I have found with the substances I have tested that baking at 320° F. for three hours is sufficient to produce a satisfactory film, while with many substances a lower temperature and a lesser time will also give a film of desirable characteristics.

Where the baked film is treated with a substance which is mutually soluble in or adsorbable with respect to the baked film and to rubber, it is satisfactory to cover the baked film with a thin, coherent layer. I have found that excellent results may be obtained by merely moistening the baked film with an organic solvent, such as benzol, gasoline, or turpentine, and that other liquid materials, such as rubber cement, thermoplastic rubber cement, rosin, sulphur chloride, diethyl sulfate and hexachlor-ethane may be employed with equally good results.

A rubber composition of any desired character, either vulcanizable or unvulcanizable, may be bonded to the film-coated backing merely by placing the two in contact, the film having been moistened with a mutual solvent or not, and subjecting the assemblage to a heat and pressure. Where a vulcanizable rubber composition is employed, the heating should be for such time and temperature as to effect proper cure of the rubber composition.

The following specific examples are here in given by way of illustration.

*Example 1.*—In bonding a curable rubber composition to a steel plate, the surface of the plate was first cleansed by sandblasting. A film or coating composition was then prepared by admixing into 100 parts by weight of crude rubber on a roll mill, 10 parts of dinitronaphthalene and 10 parts of manganese linoleate, and this admixture dispersed in benzol to give approximately a 10 percent rubber solution. The cleansed surface of the steel plate was coated with this solution and then subjected to heat in an oven maintained at 286° F. for 3 hours. A dry tough film firmly coherent to the metal was thus formed. The baked film was then moistened with gasoline and a fabric strip covered with a curable rubber composition superposed on the moistened film, the contacting surface of the rubber being first wiped with a cloth wet with gasoline to remove loose foreign substances therefrom. The assembled mass was then placed in a vulcanizing press and the rubber composition cured. The resulting composite product was treated in a Cooey machine for strength of adhesion and showed a friction pull of 12 pounds per inch, in comparison with a friction pull of between 1 and 2 pounds per inch for a rubber covered fabric cured to sandblasted metal with the strongest rubber cements interposed between the rubber and metal.

*Example 2.*—A composite construction similar to that of Example 1 was made by coating a sand-blasted steel plate with a 10 percent organic solution of rubber to which copper sulfate (20 parts by weight to 100 parts of rubber) had been added. The coated plate was baked for 3 hours at 320° F. When cool, the baked film was coated with a continuous coating of sulfur chloride and a curable rubber covered fabric strip vulcanized thereto as in the preceding example. The resulting composite product when tested in a Cooey machine showed a friction pull of 30½ pounds.

*Example 3.*—Generally it is difficult to obtain firm adhesions of sulfur-containing rubber compositions to brass. The present method, however, is particularly adapted to accomplish satisfactorily this result. As illustrative of such a construction, a sand-blasted brass plate is coated with linseed oil and baked for 3 hours at 320° F., or until a firm dry film is formed. When cooled the film is coated with a rubber cement and a curable rubber covered fabric superposed thereon and subjected to pressure and vulcanizing temperatures for a time sufficient to vulcanize the rubber. This construction when tested on the Cooey machine shows a friction pull of approximately 45 pounds per inch. The other film-forming materials herein listed may be baked onto brass to give satisfactory composite products.

*Example 4.*—In another experiment, a plate of zinc was sandblasted and coated with menhaden oil, and then heated in a baking oven maintained at 320° F. for three hours. When cool, the dry baked film was coated with a rubber cement and a curable rubber covered fabric vulcanized thereagainst in a vulcanizing press as in the preceding example. A test in the Cooey machine showed a friction pull of 11 pounds per inch.

*Example 5.*—An earthen tile was coated with a liquid dispersion in an organic solvent of rubber containing 10 percent of sulfur, and the coated tile subjected to heat. When cool, the baked film was coated with rosin in an organic solvent, and curable rubber covered fabric vulcanized thereto. Test of the strength of the adhesion indicated a friction pull of 11.5 pounds.

The test of adhesion applied to the products of the above examples is that of the well known Cooey machine. In carrying out these tests the two plies or sections of the composite product are initially separated, by cutting or pulling apart, and the free end of each section clamped in a jaw of the machine. The two jaws are then moved away from each other in a linear direction at the uniform speed of one inch per minute, and indicating apparatus records the force necessary to pull apart the sections at this speed. This force is interpolated into pounds per inch width of the sections being separated and the resulting value is known as the friction pull.

It will be noted from the several examples hereinabove given that the adhesion of the rubber to the metal through the intermediary of the baked film is many times that of the adhesion of rubber when cured in contact with metal in the manner commonly employed. In many cases the bond is so strong that the rubber will tear internally before the bond to the metal will give way.

While a wide variety of substances are herein mentioned as capable of employment in the above described process, it is to be understood that the process is not limited to the specific materials herein specified but rather that the invention of the present application resides in the fundamental principles fully described in the first part of this specification, namely, the securing to the material to which the rubber is to be attached of a dry, tough baked film strongly adherent thereto, and the bonding to this film of a rubber composition, preferably by the vulcanization of the rubber in contact therewith. Within the broad principles of this invention as thus laid down, many modifications and variations may be made without departing from the spirit of the invention herein described, and I therefore do not purpose wholly to limit the claims hereof except as may be necessitated by the prior art.

I claim:

1. A method of bonding rubber compositions to metals and to other relatively impervious materials comprising applying to the surface of such a material a coherent coating of an organic substance which hardens by oxidation when heated in thin films, heating the coated material to form a relatively dry, tough film strongly adherent to said material, and bonding a rubber composition to said film.

2. A method of bonding rubber compositions to metals and to other relatively impervious materials comprising applying to the surface of such a material a coherent coating of an organic substance which hardens by oxidation when heated in thin films, heating the coated material to form a relatively dry, tough film strongly adherent to said material, coating said film with a substance adsorbable with respect to rubber and to the film, juxtaposing a rubber composition on said coated film, and subjecting the assembled structure to heat and pressure.

3. A method of bonding rubber to metal comprising applying to the metal surface a coherent coating of an organic substance which hardens by oxidation when heated in thin films, heating the coated metal to form a relatively dry, tough film strongly adherent to the metal, and bonding rubber to said film.

4. A method of bonding rubber to metal comprising applying to the metal surface a coherent coating of an organic substance which hardens by oxidation when heated in thin films, heating the coated metal to form a relatively dry, tough film strongly adherent to the metal, and vulcanizing a curable rubber composition in contact with said film.

5. A method of bonding rubber to metal comprising applying to the metal surface a coherent coating of an organic substance which hardens by oxidation when heated in thin films, heating the coated metal to form a relatively dry, tough film strongly adherent to the metal, coating said film with a substance adsorbable with respect to rubber and to the film, and vulcanizing a curable rubber composition in contact with said coated film.

6. A method of bonding rubber to metal comprising applying to the metal surface a coherent coating of an organic substance which hardens by oxidation when heated in thin films, heating the coated metal to form a relatively dry, tough film strongly adherent to the metal, coating said film with a substance adsorbable with respect to rubber and to the film at vulcanizing temperatures, and vulcanizing a curable rubber composition in contact with said coated film.

7. A method of bonding rubber to metal comprising applying to the metal surface a coherent coating of an organic substance which hardens by oxidation when heated in thin films, heating the coated metal to form a relatively dry, tough film strongly adherent to the metal, coating said film with a substance at least partially soluble in rubber and in said film, and vulcanizing a curable rubber composition in contact with said coated film.

8. A method of bonding rubber to metal comprising applying to the metal surface a thin coherent coating of a rubber composition, heating the coated metal sufficiently to transform the said coating into a relatively dry tough film, coating said film with a substance at least partially soluble in rubber, and vulcanizing a curable rubber composition in contact with said coated film.

9. A method of bonding rubber to metal comprising applying to the metal surface a thin coherent coating of a rubber composition, heating the coated metal sufficiently to transform the said coating into a relatively dry tough film, coating the film with a rubber cement, and vulcanizing a curable rubber composition in contact with said coated film.

10. A method of bonding rubber to metal comprising applying to the metal surface a thin coherent coating of a composition containing rubber and a drying agent, heating the coated metal sufficiently to convert the said coating into a relatively dry tough film, coating said film with a substance at least partially soluble in rubber, and vulcanizing a curable rubber composition in contact with said coated film.

11. A method of bonding rubber to metal comprising applying to the metal surface a thin coherent coating of a composition containing rubber and magnesium oxide, heating the coated metal sufficiently to transform the coating of rubber into a relatively dry tough film, coating the film with a rubber cement, and vulcanizing a curable rubber composition in contact with said coated film.

12. A method of bonding rubber to metal comprising applying to the metal surface a coating of an organic substance which hardens by oxidation when heated in thin films, heating the coated metal to form a relatively dry, tough film strongly adherent to the metal, coating the said film with a substance adsorbable to rubber and to the material of the film, and vulcanizing a body of rubber composition in pressure contact with said coated film.

13. A method of bonding rubber of metal comprising applying to the metal surface a coating of composition spreadable in a thin film and containing a vegetable resin which hardens by oxidation when heated in thin films, heating the coated metal to form relatively dry, tough film strongly adherent to the metal, coating the said film with a substance adsorbable to rubber and to the material of the film, and vulcanizing a body of rubber composition in pressure contact with said coated film.

14. A method of bonding rubber to metal comprising applying to the metal surface a coating of a composition spreadable into a thin film and comprising an oxidizable oil, heating the coated metal to convert the spreadable composition into a relatively dry, tough film, coating the said film with a substance adsorbable to rubber and to the material of the film, and vulcanizing a body of rubber composition in pressure contact with said coated film.

15. A method of bonding rubber to metal comprising applying to the metal surface a coating of a composition spreadable in a thin film and containing a substance selected from the class consisting of rubber and rubber derivatives, heating the coated metal to convert the spreadable composition into a relatively dry, tough film, coating the said film with a substance adsorbable to rubber and and to the material of the film, and vulcanizing a body of rubber composition in pressure contact with the said coated film.

16. A method of bonding rubber to metal comprising applying to the metal surface a coating of an organic substance which hardens by oxidation when heated in thin films, heating the coated metal to form a relatively dry, tough film strongly adherent to the metal, coating said film with a composition comprising a liquid solvent for rubber, and vulcanizing a body of rubber composition in pressure contact with said coated film.

17. A method of bonding rubber to metal comprising applying to the metal surface a coating of a composition spreadable into a thin film and comprising a substance selected from a class consisting of rubber and rubber derivatives, heating the coated metal to convert the spreadable composition into a relatively dry tough film, coating said film with a composition comprising a liquid solvent for rubber, and vulcanizing a body of rubber composition in pressure contact with said coated film.

18. The method as set forth in claim 1 in which an accelerator of film formation is added to the metal coating material prior to its heating.

19. An article of manufacture consisting of rubber and another material integrally united by an intermediate oxidized film baked to the said material.

20. An article of manufacture consisting of rubber and metal integrally united by an intermediate oxidized film baked to the metal.

21. An article of manufacture consisting of rubber and metal integrally united by an intermediate baked film comprising a substance selected from a class consisting of rubber and rubber derivatives.

22. An article of manufacture consisting of rubber and metal integrally united by an intermediate baked film comprising a vegetable resin.

23. An article of manufacture consisting of rubber and metal integrally united by an intermediate baked film comprising an oxidizable oil.

In witness whereof I have hereunto set my hand this 20th day of April, 1927.

HAROLD GRAY.